(12) United States Patent
Syme et al.

(10) Patent No.: US 6,844,411 B2
(45) Date of Patent: Jan. 18, 2005

(54) PROCESS FOR THE PREPARATION OF ISOOLEFIN POLYMERS WITH CONTROLLED FREE-RADICAL CURABILITY

(75) Inventors: Dave Syme, Sarnia (CA); Adam Gronowski, Sarnia (CA); Gabor Kaszas, London (CA); Kenneth Norman Watson, Forest (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 10/690,205

(22) Filed: Oct. 21, 2003

(65) Prior Publication Data

US 2004/0132944 A1 Jul. 8, 2004

(30) Foreign Application Priority Data

Oct. 24, 2002 (CA) .............................................. 2409600

(51) Int. Cl.$^7$ ........................... C08F 236/20; C08F 2/00
(52) U.S. Cl. ........................ 526/336; 526/59; 526/339; 356/51
(58) Field of Search ........................... 526/59, 336, 339

(56) References Cited

U.S. PATENT DOCUMENTS 3,584,080 A * 6/1971 Walker et al. .............. 524/521
6,534,611 B1 * 3/2003 Darling et al. .............. 526/338

OTHER PUBLICATIONS

Ullmanns Encyclopedia of Industrial Chemistry, vol. A 23, (month unavailable) 1993, pp. 288–295, Rubber, 3, Synthetic.
Rubber Chem. Technol. 42, Feb. 1969, pp. 1147–1154, C.E. Oxley and G.J. Wilson, "A Peroxide Curing Butyl Rubber".

* cited by examiner

Primary Examiner—Fred Teskin
(74) Attorney, Agent, or Firm—Godfried R. Akorli; Jennifer R. Seng

(57) ABSTRACT

The present invention is relates to a process for the preparation of an isoolefin polymer containing repeating units derived from at least one isoolefin, at least one divinyl aromatic monomer and, optionally, additional copolymerizable monomers, wherein the content of unreacted vinyl groups from the aromatic monomer is predicted by means of FTIR measurements.

The present invention is related to a process for the preparation of an isoolefin polymer comprising repeating units derived from at least one isoolefin, at least one divinyl aromatic monomer and, optionally, further copolymerizable monomers, wherein the content of unreacted vinyl groups from the aromatic monomer is predicted by means of FTIR measurements and said prediction is subsequently used to alter at least one process parameter.

6 Claims, 1 Drawing Sheet

PROCESS FOR THE PREPARATION OF ISOOLEFIN POLYMERS WITH CONTROLLED FREE-RADICAL CURABILITY

FIELD OF THE INVENTION

The present invention provides a process for the preparation of an isoolefin polymer containing repeating units derived from at least one divinyl aromatic monomer wherein the curability of the polymer in a free-radical process is controlled or predicted by means of FTIR measurements.

BACKGROUND OF THE INVENTION

The process used at present for producing butyl rubber is known, for example see Ullmanns Encyclopedia of Industrial Chemistry, Vol. A 23, 1993, pages 288–295. The cationic copolymerization of isobutylene with isoprene in the slurry process and with methyl chloride as the process diluent is carried out at −95° C. using aluminum trichloride as an initiator activated by the addition of small amounts of water or hydrogen chloride. The low polymerization temperatures are necessary in order to achieve sufficiently high molecular weights for rubber applications.

The use of divinyl aromatic monomers, such as divinylbenzene (DVB), in the cationic polymerization of isobutylene and isoprene leads to the formation of crosslinked structures when both vinyl groups of the DVB molecules are reacted and incorporated into different polymer chains. The resulting isoolefin polymer therefore will have a certain amount of gel, i.e., a fraction insoluble in a hydrocarbon solvent such as cyclohexane. During crosslinking processes, a certain portion of divinylbenzene molecules reacts only partially. This happens when only one vinyl group of the crosslinking agent reacts and becomes chemically bound to a polymeric chain while the other vinyl group remains as an unreacted group in the chain. It was demonstrated ("Rubber Chem. Technol.", 42 (1969) 1147–1154) that these so-called pendant vinyl groups are critical in imparting to such polymers curability with free radicals, e.g., from decomposition of peroxides. This feature distinguishes such polymers from regular butyl rubber or polyisobutylene, with the latter polymers decomposing under the action of peroxides.

The commercial terpolymer of isobutylene, isoprene and divinylbenzene, manufactured by Bayer Inc., is known under the name of XL-10000. Several of its applications are based on peroxide-induced cure of this specialty polymer. Presently, there is no method to steer the manufacturing process of this polymer with respect to controlling its composition that affects subsequent behavior during vulcanization with peroxides. The development of such a process control tool is very desirable. It could be used to tailor-make polymers with targeted curability for particular applications.

SUMMARY OF THE INVENTION

The present invention relates to a process for the preparation of an isoolefin polymer containing repeating units derived from at least one isoolefin, at least one divinyl aromatic monomer and, optionally, additional copolymerizable monomers, where the curability of said polymer in a free-radical process is controlled or predicted by means of FTIR measurements.

The present invention also relates to a process for the preparation of an isoolefin polymer containing repeating units derived from at least one isoolefin, at least one divinyl aromatic monomer and, optionally, additional copolymerizable monomers, where the peroxide-induced cure of the polymer is controlled or predicted by means of FTIR measurements.

Further, the present invention also relates to a process for the preparation of an isoolefin polymer containing repeating units derived from at least one isoolefin, at least one divinyl aromatic monomer and, optionally, additional copolymerizable monomers, where the peroxide-induced curability of the polymer is predicted by means of FTIR measurements and the prediction is subsequently used to alter at least one process parameter.

DETAILED DESCRIPTION

Figure 1:
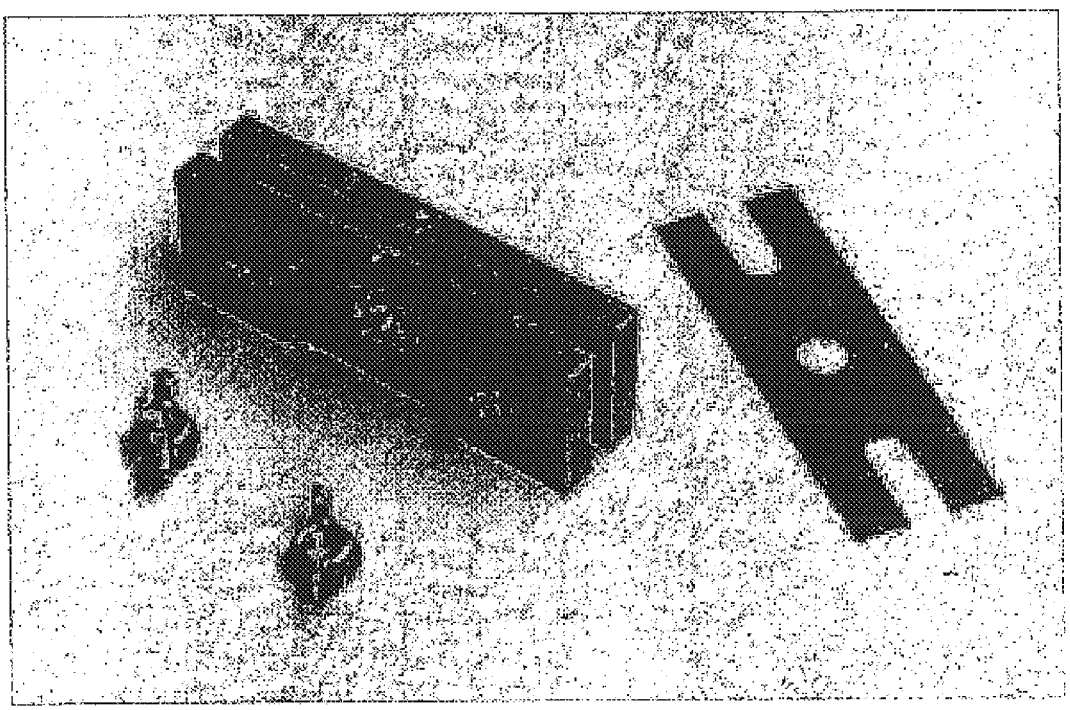
FIG. 1 illustrates a 4 mm diamond compression cell with a steel gasket useful in the present invention.

The process of the present invention can be used in the case of isoolefins having from 4 to 16 carbon atoms. The isoolefin(s) can becopolymerized with one or more divinyl aromatic monomers and one or more dienes, such as conjugated dienes, that are copolymerizable with the isoolefin (s), optionally in the presence of additional copolymerizable monomers. For example, isobutylene, isoprene and divinylbenzene, optionally in the presence of additional copolymerizable monomers can be used. Also, for example alkyl-substituted vinyl aromatic comonomers such as $C_1$–$C_4$-alkyl substituted styrene can be used.

The final polymer has repeating units derived from isoolefin(s), in the range 99.9–70 mol %, or for example, in the range of 98.0–80.0 mol %.

The final polymer has repeating units derived from diene (s), in the range 0–20 mol %, or for example, in the range of 0.5–10 mol %.

The final polymer has repeating units derived from divinyl aromatic monomer(s), in the range of from 0.1–10 mol %, or for example, in the range of 0.5–8.0 mol %.

According to the present invention, peroxide-induced curability of the polymer is estimated from the value of the peak height at 988 $cm^{-1}$ obtained from the FTIR measurement carried out on the polymer.

The polymerization process can be carried out in a solvent or diluent suitable for cationic polymerization, such as halogenated and non-halogenated hydrocarbons or mixtures thereof, for example, chloroalkanes and chloroalkane/alkane mixtures, further, for example, methyl chloride or methylene chloride or mixtures thereof with alkanes.

The present invention is not restricted to a special catalyst. Thus, any catalyst known in the art to polymerize isoolefin (s), divinyl aromatic monomers and, optionally additional copolymerizable monomers could be used. For Example, aluminum halides. The aluminum halides useful according to the present invention are selected from the group consisting of aluminum trichloride, ethylaluminum dichloride, ethylaluminum sesquichloride or mixtures thereof. For example, the aluminum halide can be aluminum trichloride activated by a co-agent such as water or hydrogen chloride. It is also possible to use other catalyst systems, such as those prepared from titanium tetrachloride, tin tetrachloride, boron trifluoride, boron trichloride, or vanadium tetrachloride or mixtures of aluminum halides with the above other catalysts. Such combinations of catalyst systems are also included in the subject of the present invention.

Polymerization of the monomers is generally carried out cationically at temperatures in the range from −120° C. to +20° C., or for example, in the range from −100° C. to −20° C.

The polymerization may be carried out in either continuous or discontinuous operation. In the case of continuous operation, the process is preferably carried out with the following three feed streams:

solvent/diluent+isoolefin (such as, isobutylene) and divinyl aromatic compound optionally diene (such as, isoprene)

aluminum halide (such as, AlCl$_3$ in a solvent with some water).

In the case of discontinuous operation, the process may be carried out, for example, as follows:

The reactor, pre-cooled to reaction temperature, is charged with the solvent or diluent and the monomers. The initiator (such as, aluminum halide and water) is then added to the reactor in the form of a dilute solution. The reactor is cooled from outside in such a manner that the heat of polymerization can be effectively dissipated. The progress of the reaction can be monitored by following the changes in temperature of the reaction feed, e.g., using a thermocouple. All operations are carried out under conditions excluding the presence of moisture and oxygen in the system, for example under an atmosphere of dry nitrogen. When the polymerization is completed, a reaction-terminating agent, such as ethanol, is added to the reactor.

Within the present invention, special attention is given to the peak height and area for the 988 cm$^{-1}$ peak in a transmission FTIR spectrum of an isoolefin polymer. This absorption results from twisting C—H (out-of-plane) vibrations of a vinyl group bonded to a phenyl ring, i.e., from divinyl aromatic monomer with pendant and unreacted vinyl groups present in the polymer.

Basically, the spectra can be recorded by any known FTIR analysis set-up that can handle a liquid or solid sample. Iin this invention a 4-mm stainless steel diamond cell, according to FIG. 1, is a sample holder and the sample would be a solid sample.

In order to receive reliable data for heights and areas of the FTIR peaks, it is usually beneficial to record a background spectrum, which would then be subtracted from the sample spectrum. For example, this background spectrum would be recorded for a polymer identical to the sample except that all divinyl aromatic monomer in the polymer would be substituted by isoolefin monomer such that the peak at 988 cm$^{-1}$ would not be affected by the background. It usually will add reproducibility to the measurement if the scanning velocity of the spectrometer is reduced and the aperture opening is larger. The best parameters to be used will be readily available from some preliminary tests. It is useful to perform the FTIR analysis on a finished/dried polymer sample so that the content of residual monomers, such as, residual divinyl aromatic monomer is minimal. However, the residual divinyl aromatic monomer, even if present in the sample, contributes to the absorption at 988 cm$^{-1}$ and it can participate in vulcanization reactions involving free-radicals. The higher peak height and area below the 988 cm$^{-1}$ peak, the higher the amount of divinyl aromatic monomer with pendant and unreacted vinyl groups present in the polymer and the higher is peroxide-inducible curability in the final polymer. The results from peroxide-induced curing of the different samples could be linked to the peak height and area below the 988 cm$^{-1}$ peak in the corresponding FT-IR spectrum and a respective calibration curve could be generated.

By means of the process according to the invention it is possible to prepare isoolefin copolymers with a controlled content of an aromatic monomer having pendant vinyl groups. This in turn affects the cure properties of the said polymers in free-radical processes, e.g., initiated by the decomposition of peroxides. The result of the FTIR measurement will be used to change the process parameters in such a manner that more or less of the divinyl aromatic monomer with pendant vinyl groups will be incorporated into the polymer chains. One possible change in the process parameters would be to increase or decrease the amount of divinyl aromatic monomer in the reaction mixture by increasing or decreasing the flow of the divinyl aromatic monomer to the reactor. Other possible ways of changing the process parameters will be changing the catalyst supply, or reaction temperature or pressure. The skilled in the art will be aware of several other ways of influencing the composition of the growing polymer chains and the efficiency of crosslinking reactions taking place in the reactor.

Crosslinking, as with other rubbers, increases the green strength, improves the dimensional stability and reduces the cold flow; the elastic behavior ('memory') is also clearly changed as compared with that of the regular grades of butyl rubber.

The obtained polymers are very suitable for the production of several useful articles. Typical applications for the butyl terpolymer containing divinylbenzene include seals, adhesives and sealing compounds, coatings, cements and tapes for covering pipes. More recently, this special grade of rubber is finding increasing use in manufacturing condenser caps. XL-10000 is the main component of the compound (containing carbon black and other ingredients) which is cured with peroxides. The electrolytic condensers are used mainly in TV, DVD players, audio equipment, PC-monitor and in the automotive industry (air bags and ABS control systems).

The Examples which follow are given to illustrate the present invention.

EXAMPLES

Experimental Details

Methyl chloride (Dow Chemical) serving as a diluent for polymerization and isobutylene monomer (Matheson, 99%) were transferred into a reactor by condensing a vapor phase. Aluminum chloride (99.99%), isoprene (99%) and 2,4,4-trimethyl-1-pentene (99%) were from Aldrich. The inhibitor was removed from isoprene by using an inhibitor removing disposable column from Aldrich. Commercial divinylbenzene (ca. 64%) was from Dow Chemical.

The mixing of a compound with carbon black (IRB #7) and peroxide (DI-CUP 40C, Struktol Canada Ltd.) was done using a miniature internal mixer (Brabender MIM) from C. W. Brabender, consisting of a drive unit (Plasticorder® Type PL-V151) and a data interface module.

The following compounding recipe was used:

butyl-based polymer: 100 phr carbon black (IRB#7): 50 phr peroxide (DI-CUP 40C): 1.0 phr or 0.6 phr The following mixing steps were carried out:

0 min: add a polymer 1.5 min: add carbon black (slowly, in increments)

7.0 min: add peroxide 8.0 min: remove

The obtained compound was passed though a mill (6"×12") six times with a tight nip gap.

The Moving Die Rheometer (MDR) test was performed according to ASTM standard D-5289 on a Monsanto MDR 2000 (E). The upper die oscillated through a small arc of 1 degree.

The solubility of a polymer was determined after the sample refluxed in cylohexane over 60-minute period.

Curing was done using an Electric Press equipped with an Allan-Bradley Programmable Controller.

Stress-strain tests were carried out using the Instron Testmaster Automation System, Model 4464.

The FTIR measurements were carried out using a Nicolet Nexus 670 FTIR spectrometer with DTGS detector. A sample was placed in a custom-made 4-mm-diameter-window diamond compression cell and a commercially produced Specac) four-time-KRS5-lensed beam condenser to increase the signal-to-noise ratio. Also, samples with controlled weight and a 0.25-mm stainless steel gasket were used in the compression cell to keep the specimen's dimensions constant during the measurement. This configuration improved the signal dramatically and allowed the peak associated with the aromatic vinyl microstructure at 988 $cm^{-1}$ to be measured quantitatively.

An important feature of this cell was its rigidity, which minimized variations in the parallel orientations of both diamond surfaces. This was opposite to some commercially available cells designed to flex. Such variations in diamond window orientation contribute to a scatter in obtained values from the test due to the appearance of different fringing patterns in the spectra.

The background spectrum was that of a 'conventional' butyl rubber. The subtraction of the base butyl background was required to determine the peak height at 988 $cm^{-1}$ due to twisting C—H (out-of-plane) vibrations of a vinyl group bonded to a phenyl ring. The scanning velocity was set to 0.158 and the aperture to 130.

The $^1$H-NMR measurements were performed using a Bruker Avance 500 MHz NMR spectrometer. Thirty-two scans of each material were collected in a 5-mm diameter probe with a delay of 10 s.

Example 1

To a 50 mL Erlenmeyer flask, 0.45 g of $AlCl_3$ was added, followed by 100 mL of methyl chloride at $-30°$ C. The resulting solution was stirred for 30 min at $-30°$ C. and then cooled down to $-95°$ C., thus forming the catalyst solution.

To a 2000 mL glass reactor equipped with an overhead stirrer, 900 ML of methyl chloride at $-95°$ C. were added, followed by 100.0 mL isobutylene at $-95°$ C., 3.0 mL of isoprene at room temperature, 0.5 mL DVB at room temperature, and 1.0 mL of 2,4,4-trimethyl-1-pentene. The latter chemical served as a chain transfer agent during polymerizations in order that the formed polymer was soluble in an organic solvent. The reaction mixture was cooled down to $-95°$ C. and 10.0 mL of the catalyst solution was added to start the reaction.

The reaction was carried out in MBRAUN® drybox under the atmosphere of dry nitrogen. The reaction was terminated after 5 minutes by adding into the reaction mixture 10 mL of ethanol containing some sodium hydroxide.

The polymer was steam coagulated and dried on a 6"×12" mill at ca. 105° C. followed by drying in a vacuum oven at 50° C. to a constant weight.

The solubility of the polymer in cyclohexane was 98.6 wt. %. The peak height at 988 $cm^{-1}$ from the FTIR test was 0.012. The content of aromatic species with vinyl groups in the polymer determined from $^1$H-NMR was 0.050 mol %.

Example 2

The methodology of Example 1 was repeated except 2.0 mL of DVB was used instead of 0.5 mL and 1.5 mL of 2,4,4,-trimethyl-1-pentene was used instead of 1.0 mL.

The solubility of the polymer in cyclohexane was 99.2 wt. %. The peak height at 988 $cm^{-1}$ from the FTIR test was 0.039. The content of aromatic species with vinyl groups in the polymer determined from $^1$H-NMR was 0.157 mol %.

Example 3

The methodology of Example 1 was repeated except 3.5 mL of DVB was used instead of 0.5 mL and 2.5 mL of 2,4,4,-trimethyl-1-pentene was used instead of 1.0 mL.

The solubility of the polymer in cyclohexane was 99.7 wt. %. The peak height at 988 $cm^{-1}$ from the FTIR test was 0.070. The content of aromatic species with vinyl groups in the polymer determined from $^1$H-NMR was 0.246 mol %.

The above examples demonstrate that there is a correlation between the values of the peak height at 988 $cm^{-1}$ from the FTIR test for the polymers described in the invention and the concentration of aromatic species with unreacted vinyl groups determined using an absolute method (NMR).

The following part demonstrates the utility of the present invention in a practical application based on a peroxide cure system.

The three polymers described in Examples 1–3 were individually compounded with carbon black and peroxide as described in a section with experimental details and the MDR cure characteristics of the compounds were subsequently studied. Also, the stress-strain test was performed on the cured compounds. Some results are given in Table 1.

TABLE 1

Characteristics of the raw polymers and peroxide-cured compounds based on these polymers.

| Polymer/Compound | Raw polymer | | Compounds | | | | |
|---|---|---|---|---|---|---|---|
| | Peak height at 988 $cm^{-1}$ | Aromatic monomer with C=C groups (mole %) | $M_H$ (dN · m) | $M_H - M_L$ (dN · m) | Hardness Shore A2 (pts) | Ultimate Tensile (MPa) | Stress at 100% elongation (MPa) |
| 1 | 0.012 | 0.050 | 2.47 | 0.87 | 22 | 0.18 | 0.29 |
| 2 | 0.039 | 0.157 | 4.06 | 2.34 | 31 | 3.47 | 0.55 |
| 3 | 0.070 | 0.246 | 6.83 | 5.12 | 39 | 4.42 | 1.00 |

These results demonstrate that the cure state of the peroxide-cured compounds (represented by the values of the delta torque $M_H$-$M_L$ from the MDR test), as well as stress-strain properties of the said compounds depend on the content of aromatic species with vinyl groups which are present in the raw polymers.

Example 4

Two commercial polymers of the crosslinked butyl rubber (XL-10000) sampled from two different reactors were analyzed for solubility in an organic solvent (cylohexane). The solubility of polymer A was 24.8 wt. % and that of polymer B was 25.0 wt. %, so the content of a crosslinked fraction in both polymers was essentially identical. It was desirable to know which polymer would cure better with peroxides.

The FTIR test was performed according to the procedure described in the present invention. The value of peak height at 988 cm$^{-1}$ for the polymer A was 0.090 and the respective value for the polymer B was 0.117. This indicated that the reaction conditions in reactor B favored the formation of a better curing polymer.

The two polymers were compounded similarly as described previously, this time using 0.6 phr of peroxide in the formulation. The compound based on polymer B had the value of delta torque ($M_H$-$M_L$) higher by 2.3 units (dN.m) than that for the compound based on polymer A. In addition, the cure rate, as measured by t'50-t'10 (min), was by 2.32 min faster for the compound with polymer B than for the respective compound with polymer A.

This confirmed that the compound containing a polymer with more aromatic vinyl groups cured better than the other did.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for the preparation of an isoolefin polymer comprising repeating units derived from at least one divinyl aromatic monomer, comprising the step of predicting the content of unreacted vinyl groups from the aromatic monomer in the polymer by means of FTIR measurements.

2. Process according to claim 1 wherein the peak height at 988 cm$^{-1}$ is analyzed.

3. Process according to claim 1, wherein following predicting the content of the unreacted vinyl groups form the aromatic monomer by FTIR measurements, changing one or more process parameters according to the result of the FTIR measurement.

4. Process according to claim 3, wherein one or more process parameters are changed to achieve a desired peroxide-induced curability of a raw polymer or its compound.

5. Process according to claim 1, wherein the divinyl aromatic monomer is divinylbenzene.

6. Process according to claim 1, comprising polymerizing isobutylene, isoprene, divinylbenzene and optionally additional copolymerizable monomers.

* * * * *